United States Patent
Arnold et al.

(10) Patent No.: US 7,461,732 B2
(45) Date of Patent: Dec. 9, 2008

(54) METHOD FOR COOLING A LIQUID-COOLED FRICTION CLUTCH AND LIQUID-COOLED FRICTION CLUTCH

(75) Inventors: Johannes Arnold, Achern (DE); Wolfgang Reik, Buehl (DE); Ivo Agner, Buehl (DE); Oliver Noehl, Buehlertal (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 249 days.

(21) Appl. No.: 11/375,754

(22) Filed: Mar. 15, 2006

(65) Prior Publication Data
US 2006/0207855 A1 Sep. 21, 2006

(30) Foreign Application Priority Data
Mar. 16, 2005 (DE) .................. 10 2005 012 034

(51) Int. Cl.
*F16D 13/00* (2006.01)
(52) U.S. Cl. ................................. 192/113.34
(58) Field of Classification Search ........................ None
See application file for complete search history.

(56) References Cited

U.S. PATENT DOCUMENTS

| | | | | |
|---|---|---|---|---|
| 2,210,416 A * | 8/1940 | Kiep et al. | ............... | 192/85 AA |
| 3,366,210 A * | 1/1968 | Webster | ................. | 192/113.34 |
| 3,474,888 A * | 10/1969 | Carlson et al. | ........... | 192/113.1 |
| 3,610,384 A * | 10/1971 | Borck | ..................... | 192/103 B |
| 3,768,613 A * | 10/1973 | Brunner | ................. | 192/113.34 |
| 4,280,608 A * | 7/1981 | LaBuda et al. | ........... | 192/113.3 |
| 4,321,990 A * | 3/1982 | Koch, Jr. | .................. | 192/13 R |
| 6,568,518 B2 * | 5/2003 | Sarar | ......................... | 192/48.8 |
| 2005/0247537 A1 | 11/2005 | Kuhn | | |

FOREIGN PATENT DOCUMENTS

| | | |
|---|---|---|
| DE | 754 096 | 2/1953 |
| DE | 10 2004 021 067 | 11/2005 |
| EP | 1 174 633 | 1/2002 |
| GB | 1290974 | 9/1972 |

* cited by examiner

*Primary Examiner*—Dirk Wright
(74) *Attorney, Agent, or Firm*—Simpson & Simpson, PLLC

(57) ABSTRACT

A liquid-cooled friction clutch contains at least one lamella, which is connected rotationally fixed to a driveshaft, at least one lamella, which is connected rotationally fixed to an output shaft, these lamellae being able to be pressed mutually against one another and being positioned inside a clutch housing connected rotationally fixed to the driveshaft, and a coolant liquid return line, which leads from an area radially outside the lamellae to an area radially inside the lamellae and returns coolant liquid after its radial flow along the lamellae from the radial external area into the radial internal area, an end area of the return line being implemented as a scoop tube having an intake opening which is immersed radially outside the lamellae in a coolant liquid ring rotating together with the clutch housing and returns the coolant liquid into the area radially inside the lamellae without flowing through a pump driven by external force.

17 Claims, 5 Drawing Sheets

METHOD FOR COOLING A LIQUID-COOLED FRICTION CLUTCH AND LIQUID-COOLED FRICTION CLUTCH

CROSS REFERENCE TO RELATED APPLICATION

This patent application claims priority of German Patent Application No. 10 2005 012 034.2, filed Mar. 16, 2005, which application is incorporated herein by reference.

FIELD OF THE INVENTION

The present invention relates to a method for cooling a liquid-cooled friction clutch. Furthermore, the present invention relates to a liquid-cooled friction clutch.

BACKGROUND OF THE INVENTION

The heat arising during slip on lamellae and/or friction disks, which transmit torque, is dissipated in liquid-cooled friction clutches using coolant liquid. This coolant liquid, which may be used simultaneously for lubricating bearings of the clutch or even of a transmission, circulates in a loop, within which it flows through a cooler. It is expedient to regulate the quantity of coolant liquid supplied to the clutch and flowing between the friction disks depending on the driving condition. During driving, a minimum volume flow is required to dissipate the heat arising during slip regulation. When the clutch is put in, a larger volume flow must be provided, since a larger quantity of heat arises. During synchronization, the volume flow is to be significantly reduced in order to avoid a residual drag torque on the clutch lamellae and/or friction disks and thus on the corresponding synchronization unit. In addition, the coolant liquid system must be capable of independently starting a coolant loop after the engine is started.

In EP 11 74 633 A2, from which the preambles of the independent claims proceed, a liquid-cooled friction clutch is known, in which coolant liquid, which rotates and/or revolves together with the interior of the rotating clutch housing after flowing radially through the lamellar packet and from there is removed by fixed blades first in the axial direction and then radially inward and is supplied to an oil sump of a transmission adjoining the clutch, is supplied radially within the lamellae and/or friction disks from a transmission-side attachment. In this way, coolant liquid introduced into the interior and/or wet chamber of the clutch may be returned unpressurized, so that the fill level of the coolant liquid is adjustable in such a way that the clutch lamellae are not permanently immersed in coolant liquid and drag torques are avoided. The returned coolant liquid is recirculated with the aid of a pump and resupplied to the clutch radially inside the friction disks.

SUMMARY OF THE INVENTION

The present invention is based on the object of simplifying the construction of a liquid-cooled friction clutch with good adjustability of the coolant liquid flow.

This object is first achieved by a method for cooling a liquid-cooled friction clutch, in which the coolant liquid is supplied radially within lamellae which may be frictionally engaged and transmit torque, is removed radially outside the lamellae, and is at least partially resupplied radially within the lamellae after flowing through a return flow path, at least a part of the coolant liquid removed radially outside the lamellae being resupplied radially inside the lamellae without flowing through a pump which increases the pressure level of this coolant liquid.

According to the method according to the present invention, at least a part of the coolant liquid flowing radially outward between the lamellae is resupplied to the interior of the clutch radially inside the lamellae using the kinetic energy of the coolant liquid, as well as gravity if necessary. A pump driven by external force is superfluous in this way. The volume flow of the coolant liquid conducted back to the interior of the clutch may be set easily through greatly varying measures, for example, by changing the flow cross-section of the return flow path, changing the size of an intake opening of the oil flow path, etc. It is obvious that the method according to the present invention is preferably applicable in those friction clutches whose axis of rotation is positioned in such a way that kinetic energy and gravity are usable for returning the coolant liquid, the potential energy generally being small in relation to the kinetic energy. In clutches having a vertical axis of rotation, the potential energy is not usable.

The coolant liquid resupplied without flowing through a pump, which increases the pressure level, is advantageously taken above the lamellae from a coolant liquid ring rotating radially outside the lamellae.

In a preferred form of execution of the method according to the present invention, the volume flow of the coolant liquid removed radially outside the lamellae and resupplied radially inside the lamellae is regulated by a force equilibrium between a force exerted by a coolant liquid ring rotating outside the lamellae on a scoop tube immersed in the coolant liquid ring and impulse forces which arise through the deflection of the coolant liquid, and a force which pre-tensions the scoop tube to increase its immersion depth.

Additional coolant liquid, which is conveyed from the coolant liquid flowing along the returned flow path, may be supplied radially inside the lamellae.

In a refinement of the method according to the present invention, a partial vacuum, through which the coolant liquid is suctioned and supplied to the coolant liquid ring, is generated at a contact point between a coolant liquid ring rotating inside a clutch housing and a component, which is essentially immobile around the circumference.

The object on which the present invention is based is also achieved by a liquid-cooled friction clutch, containing at least one lamella connected rotationally fixed to a driveshaft, at least one lamella connected rotationally fixed to an output shaft, these lamellae being able to be pressed against one another mutually and being positioned within a clutch housing connected rotationally fixed to the driveshaft, a coolant liquid return line, which leads from an area radially outside the lamellae to an area radially inside the lamellae and returns coolant liquid after its radial flow along the lamellae from the radial exterior area into the radial interior area, an end area of the return line being implemented as a scoop tube having an intake opening, which is immersed radially outside the lamellae in a coolant liquid ring rotating together with the clutch housing and returns the coolant liquid into the area radially inside the lamellae without flowing through a pump driven by external force.

The intake opening of the scoop tube is advantageously positioned approximately vertically above the center of the clutch.

To set the volume flow, the scoop tube may be movable in such a way that its immersion depth into the coolant liquid ring changes.

For this purpose, the scoop tube is pivotable around an axis positioned eccentrically to the axis of the coolant liquid ring, for example.

An actuator, which is connected to the scoop tube directly or with a spring interposed, is provided for pivoting the scoop tube, for example.

The force applicable by the actuator to the scoop tube against the flow direction of the coolant liquid ring is advantageously adjustable.

The scoop tube may be provided with a wing directed radially inward against the flow direction of the coolant liquid ring.

The friction clutch is, for example, implemented in such way that the coolant liquid ring rotates along in an annular trough, which is open radially on the interior and rotates with the clutch housing.

The coolant liquid overflowing from the trough is advantageously conducted by at least one blade positioned radially outside the trough to a coolant liquid reservoir located outside the clutch.

The return line advantageously leads through a temperature control unit for temperature control of the liquid.

Furthermore, it is preferable for the return line to be through a suction jet pump, whose suction intake is connected to a coolant liquid reservoir.

In a refinement of the friction clutch according to the present invention, a flow sampling component, which is implemented having an opening to which a refilling line connected to a liquid reservoir positioned outside the clutch is connected, presses against a radial interior surface of the coolant liquid ring.

The refilling line advantageously runs between the opening implemented in the flow sampling component and the liquid reservoir in the form of an upside-down U.

The flow sampling component may be elastically pre-tensioned in the direction toward the liquid ring in such way that it floats on its surface and does not sink therein.

Furthermore, it is advantageous to implement the flow sampling component in such way that it has a surface pressing tangentially against the coolant liquid ring and is bent away from the coolant liquid ring on its end directed against the flow, so that it floats on the coolant liquid ring.

It is advantageous if the end of the line contacting the coolant liquid ring is nearly perpendicular to the surface of the rotating coolant liquid ring in operation.

BRIEF DESCRIPTION OF THE DRAWINGS

The present invention will be explained in the following as an example and with further details on the basis of figures.

DETAILED DESCRIPTION OF THE INVENTION

The present invention is explained in the following on the basis of a double clutch, as is used for parallel manual shift transmissions. It is obvious that the present invention may also be used for other types of friction clutches having only one clutch unit, for example.

Figure 1:
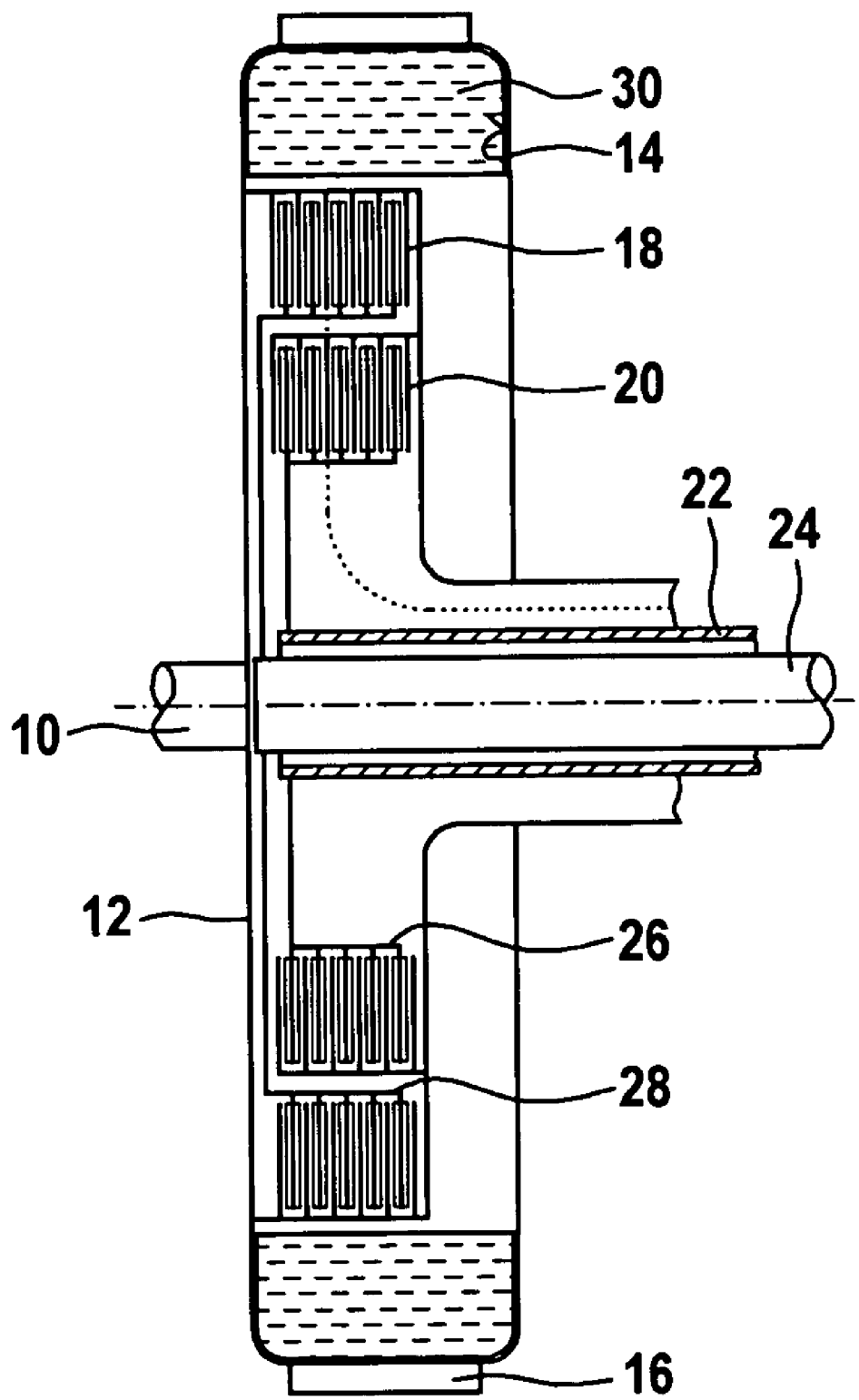
FIG. 1 shows a schematic longitudinal section through a liquid-cooled friction clutch.

According to FIG. 1, a driveshaft 10, which is driven by an engine (not shown), is rigidly connected to a clutch housing 12, which ends radially on the outside in a trough 14, which is open radially on the inside and is circular overall. The radial external side of the trough 14 is provided with blades 16. A radial external lamellar packet 18 and a radial internal lamellar packet 20 are connected rotationally fixed to the clutch housing 12 via a carrier. A hollow output shaft 22, in which a further output shaft 24 is mounted coaxially thereto, is mounted on the clutch housing 12 and/or the carrier of the lamellar packet 18 and 20 connected rigidly thereto. A radial internal lamellar packet 26 is connected rotationally fixed to the external output shaft 22 via a carrier. A radial external lamellar packet 28 is connected rotationally fixed to the internal output shaft 24 via a carrier.

The radial external lamellar packets 18 and 28 may be brought into mutual frictional engagement in a way known per se via an actuating device (not shown). The radial internal lamellar packets 20 and 26 may be brought into mutual frictional engagement via a further actuating device. Friction coatings positioned between the lamellar packets, each of which may be rigidly connected to a lamella, are not shown for the sake of simplicity.

The clutch according to FIG. 1, which is implemented having the four annular lamellar packets and/or friction disk sets, forms a double clutch, using which the driveshaft 10 may alternately be frictionally engaged to transmit torque with the driveshaft 22 or the driveshaft 24 (or with both driveshafts).

During the slip phases between the lamellar packets 18 and/or 20 fixed to the clutch housing and the lamellar packets 26 and/or 28 fixed to the output shaft, friction heat arises in the clutch, which must be dissipated. For this purpose, coolant liquid, indicated by dots, which flows as a result of the centrifugal force through the lamellar packets with radial components and rotates inside the trough 14 together therewith and/or with the clutch housing as a liquid ring 30, is supplied to the interior of the clutch housing 12, which is sealed liquid-tight according to FIG. 1 on the right side by a fixed wall (not shown) of a transmission housing, for example.

It will be explained how the coolant liquid is guided and controlled on the basis of FIG. 2.

Figure 2:
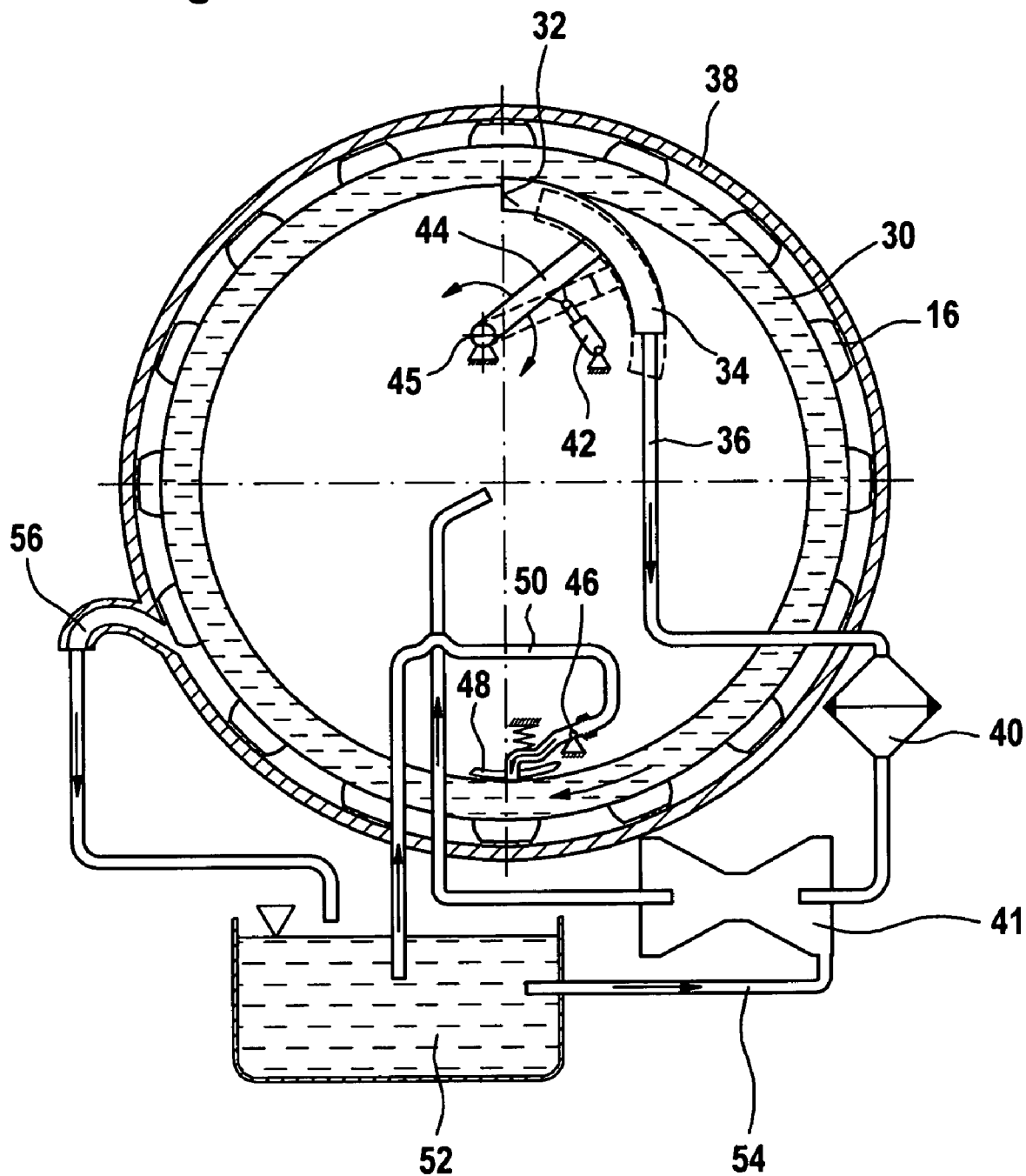
FIG. 2 shows a schematic cross-sectional view of a friction clutch according to the present invention.

According to FIG. 2, the intake opening 32, which is directed against the flow direction (indicated by an arrow) of the coolant liquid ring 30, of a scoop tube 34, which is connected at its outlet to a line 36, is immersed in the coolant liquid ring 30. The line 36 leads through a fixed housing 38, which receives the coupling, and which is implemented in one piece with a transmission housing, for example, through a temperature control device 40 and a suction jet pump 41 and then again through the housing 38 and opens into a central area of the inner chamber of the clutch housing 12 (FIG. 1) within the lamellar packets. The line 36 thus forms a return flow and/or recirculation flow path, through which coolant liquid taken radially outside from the trough 14 is resupplied directly radially to the interior to the wet chamber of the clutch. The intake opening 32 is preferably positioned approximately in the area of the upper apex of the coolant liquid ring 30. However, it may also be positioned at other points of the circulation of the coolant liquid ring.

The immersion depth of the intake opening 32 into the coolant liquid ring 30 is adjustable with the aid of an actuator 42, which changes the rotational position of an arm 44 rigidly connected to the scoop tube 34, which is pivotable around an axis 45. The position of the axis 45 is eccentric to the axis of the liquid ring 30 in such a way that the depth at which the scoop tube 34 is immersed in the liquid ring 30 changes when the arm 44, and therefore the scoop tube 34, pivots.

Therefore, with the aid of the scoop tube, a circulation flow is generated whose energy source is the rotating coolant liquid ring and the height difference between the intake opening of the scoop tube and the mouth of the line 36 into the interior of the clutch.

Figure 4:
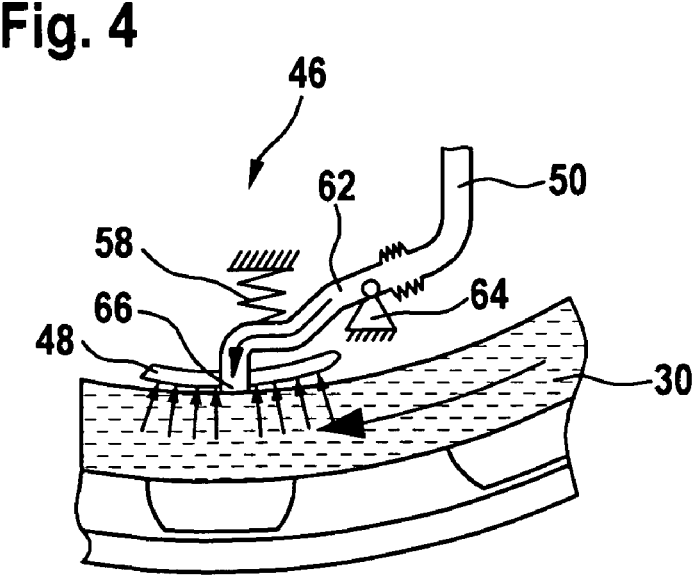
FIG. 4 shows a detail from FIG. 2 to explain an initialization device.

In order to supply coolant liquid to the interior of the clutch housing 12, which forms a wet chamber, an initialization device 46 is provided, which has a contact plate 48, described in greater detail on the basis of FIG. 4, which presses against the interior of the coolant liquid ring 30 and has an opening which is connected via a line 50 to a coolant liquid reservoir 52, such as the oil sump of a transmission. A further line 54 leads to a suction connection of the suction jet pump 41 from the coolant liquid reservoir 52.

The blades 16 attached to the radial outside of the trough 14 are used for the purpose of carrying along excess liquid, which overflows the inwardly directed edge of the trough 14 and collects on the interior of the housing 38 and supplying it through an outlet 56 to the liquid reservoir 52.

Figure 3:
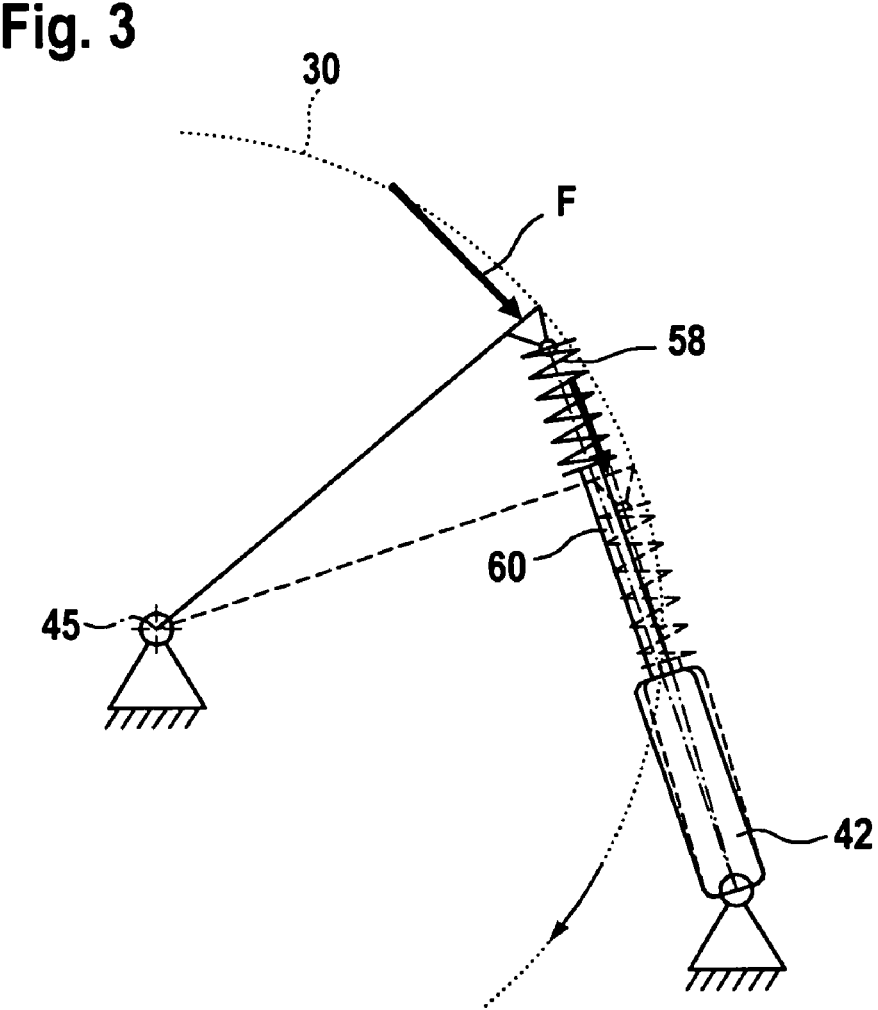
FIG. 3 shows a detail from FIG. 2 to explain the setting of a scoop tube.

In the following, the mechanism for adjusting the scoop tube 34 is explained on the basis of FIG. 3. The scoop tube 34 or its arm 44 is mounted so it is pivotable around the axis 45. A compression spring 58, which is connected to a pushrod 60 of the actuator 42, preferably engages on the scoop tube in an articulated way. The actuator 42 is preferably implemented in such a way that the force with which the pushrod 60 opposes a movement in the direction of the rotation of the coolant liquid ring 30 is adjustable, for example, as an electromagnet whose magnetic plunger may have a force dependent on the current strength through the electromagnet applied to it. The force F applied to the scoop tube 34 by the coolant liquid ring 30 is in equilibrium with the force acting from the actuator on its pushrod 60 in each case, the compression spring 58 being used for the purpose of equalizing torque oscillations on the scoop tube. If the scoop tube characteristic map is known (scoop tube force F as a function of the rotation speed of the liquid ring 30 and the temperature of the coolant liquid), the corresponding counterforce of actuator 42 may be set. The scoop tube force in turn corresponds to the volume flow of the coolant liquid taken by the scoop tube from the liquid ring, which may thus be set without a path measurement.

In the following, the initialization device 46, which is used for the purpose of filling the trough 14 with coolant liquid as soon as the driveshaft 10 rotates, is explained on the basis of FIG. 4.

According to FIG. 4, the line 50 is connected to a tube section 62, which is relatively rigid per se, and which is mounted so it is pivotable using a bearing 64 and is connected to an opening 66, which is provided in the contact plate 48, which is implemented like a waterski. The contact plate 48, which is bent opposite the flow direction of the liquid ring 30 somewhat, is pressed using a spring 58 against the surface of the liquid ring 30. The contact plate 48 advantageously presses against the interior of the coolant liquid ring 30 in the area of its lower apex.

As soon as the liquid ring 30 rotates, because of the flow velocity of the coolant liquid along the contact plate 48 into its opening 66, a partial vacuum arises which suctions the coolant liquid out of the coolant liquid reservoir 52 and introduces it into the coolant liquid ring 30. In this way, it is ensured that the trough 14 rapidly fills with coolant liquid when the engine is started. In addition, continuous exchange of the coolant liquid is ensured in that coolant liquid overflowing the trough is guided out through the outlet 56 and conducted to the coolant liquid reservoir 52.

The suction jet pump 41 begins operation as soon as the volume flow branching off from the scoop tube exceeds a specific amount.

The temperature control device 40 may be used during normal operation for cooling the coolant liquid or, when the system is still cold, for rapid heating of the coolant liquid to operating temperature.

In the following, different driving conditions are described:

a) Initialization

Figure 5:
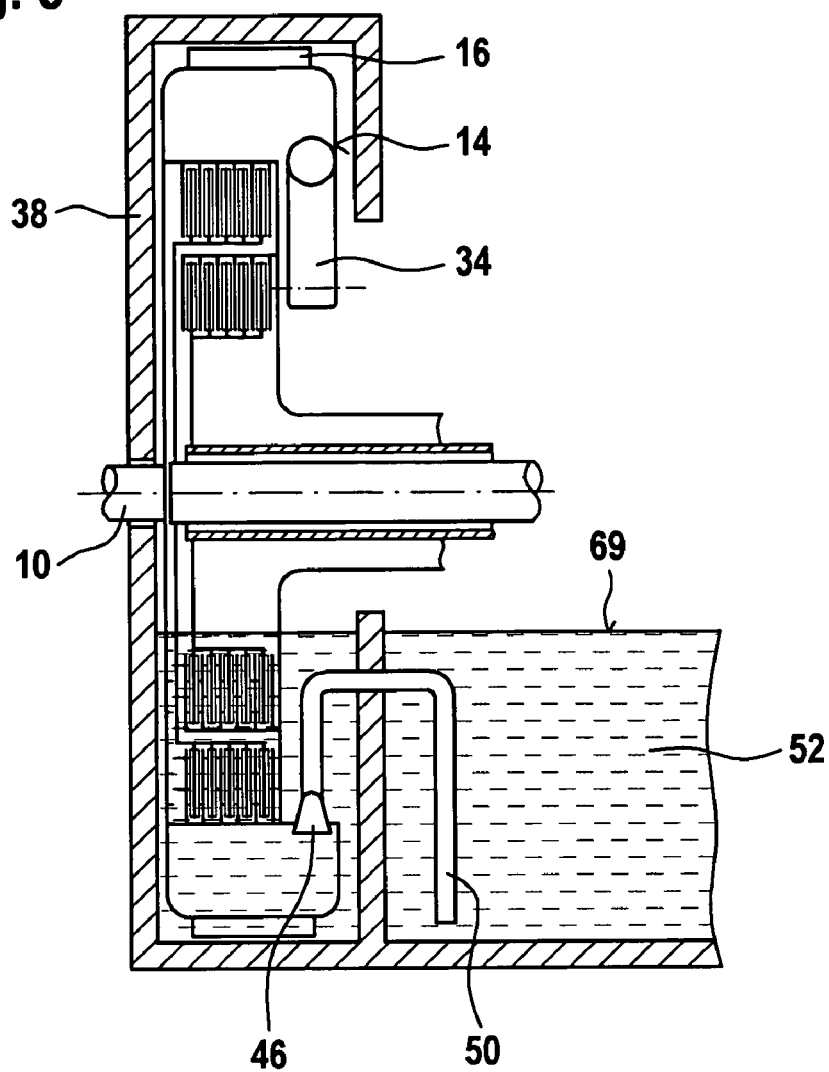
FIG. 5 shows a view similar to FIG. 1 having the coolant liquid level with a stationary engine.

When the vehicle is stationary, according to FIG. 5, the liquid level 68 equalizes between the coolant liquid reservoir 52, for example, the oil level in the transmission, because of the line 50, which is immersed completely in the coolant liquid and is implemented in the form of an upside-down U. The coolant liquid quantity forms a coolant liquid ring rotating together with the trough 14 after the engine and/or the driveshaft 10 is started. Excess oil is scooped by the blades 16 out of the clutch housing and/or the clutch bell and conveyed back into the coolant liquid reservoir 52 via the outlet 56, which is preferably implemented as a stripper.

Figure 6:
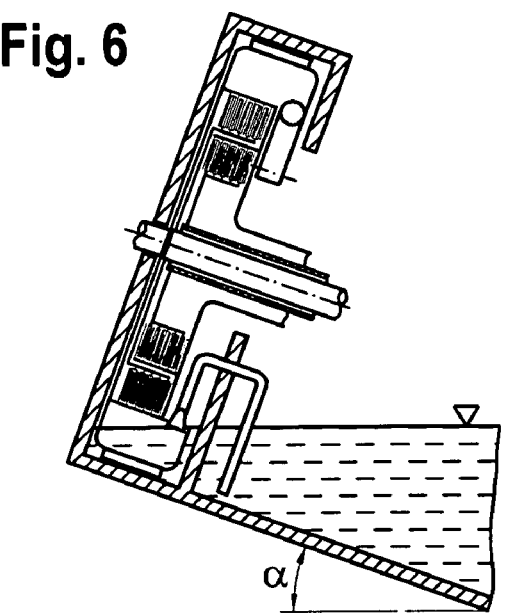
FIG. 6 shows a view of FIG. 5 with an inclined vehicle.

When the vehicle stands at an incline (angle of inclination α according to FIG. 6), in some circumstances there is less oil within the clutch, which is rapidly supplemented by the effect of the initialization device 46 described, however, until the scoop tube 34 may operate.

It is obvious that the line 50 is implemented and positioned together with the other components in such a way that even with an inclined position of the vehicle, the initialization device 46 may suction coolant liquid out of the liquid reservoir 52.

b) Driving

The scoop tube 34 is immersed by the actuator 42 into the coolant liquid ring 30 in such a way that a predefined, relatively small volume flow is scooped, which is so small that the suction jet pump 41 does not come into operation. The scooped volume flow is cooled in the temperature control device 40, which is preferably implemented as a cooler, and fed to the clutch again. A continuous liquid exchange with the liquid reservoir 52 occurs via the oil exchange mechanism of the initialization device 46. Coolant liquid, preferably transmission oil, overflowing the trough 14 is returned by the blades 30 into the liquid reservoir 52.

In the event of speed changes of the engine, the force of the actuator 42 may be set with the aid of the characteristic map of the scoop tube stored in the control unit in such a way that the scooped volume flow remains constant. In refinements of the present invention, it is conceivable to use a self-regulation effect, since a rising rotational velocity of the liquid ring 30 results in an elevated force acting on the scoop tube 34, so that it automatically moves in the direction of reduced immersion depth.

c) Starting and/or strong slip

The scoop tube 34 is immersed deeper into the coolant liquid ring 30 by increasing the actuator force, so that the scooped volume flow increases, which, after flowing through the cooler 49, flows cooled through the suction jet pump 41, which comes into operation as a result of the larger volume flow, so that additional coolant liquid is supplied to the clutch, which cools the lamellar packets. The coolant volume flow may, for example, be set as a function of the temperature of the coolant liquid downstream of the scoop tube 34 in such a way that coupling the controller of the actuator directly to a transmission control unit is not absolutely necessary. Due to the self-reinforcement effect, the suction jet pump 41 has the effect of rapidly providing the required coolant liquid quantity for the clutch.

d) Synchronization

In the state of synchronization (clutch disengaged), the actuator force is strongly reduced. The scoop tube 34 rapidly rotates far enough out of the liquid ring 30 that only a greatly reduced coolant liquid quantity is conveyed. As a result of the flow velocity in the lines, this reduction of the flow occurs very rapidly and the synchronization may be performed largely without being impaired by the coolant liquid flow.

It is obvious that the actuator 42 is advantageously attached directly to a clutch and/or transmission control unit and may be activated from there in accordance with the clutch actuations.

The system described may be altered in manifold ways.

Figure 7:
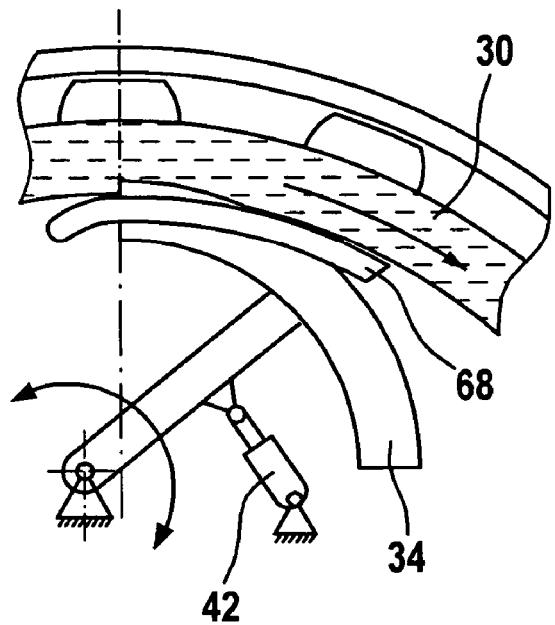
FIG. 7 shows an altered embodiment of a scoop tube.

For example, FIG. 7 shows an embodiment in which the scoop tube 34 is provided with a wing 68, preferably connected rigidly thereto, which is bent radially inward against the rotation direction of the coolant liquid ring 30. This wing opposes deeper immersion of the scoop tube into the flow with additional resistance, so that operating points may be defined better, i.e., a specific operating state and/or coolant liquid volume flow may be assigned to a contact of the liquid surface by the wing, for example. The shaping of the intake opening of the scoop tube 34 may also be changed by this characteristic curve or characteristic map.

The actuator 42 for setting the immersion depth of the scoop tube 34 and the adjustment geometry of the scoop tube 34 may be implemented in greatly varying ways. The force may be set by a hydraulic or pneumatic cylinder having a long-stroke spring or a non-self-inhibiting electric motor having settable torque. Travel controllers using greatly varying drive mechanisms, such as spindle or curve drives, are also possible, the control strategy having to be adapted appropriately in each case. The scoop tube may be moved linearly perpendicularly to the ring flow or tangentially thereto. It is important that the effective intake cross-section of an opening immersed into the coolant liquid ring is changeable. It is also conceivable to change the thickness and/or depth of the coolant liquid ring through manipulation at the trough, for example, a change of an overflow opening. The trough advantageously forms the outer edge of the clutch housing. However, it may also be implemented as a separate component attached to the clutch housing or a lamellae carrier.

Figure 8:
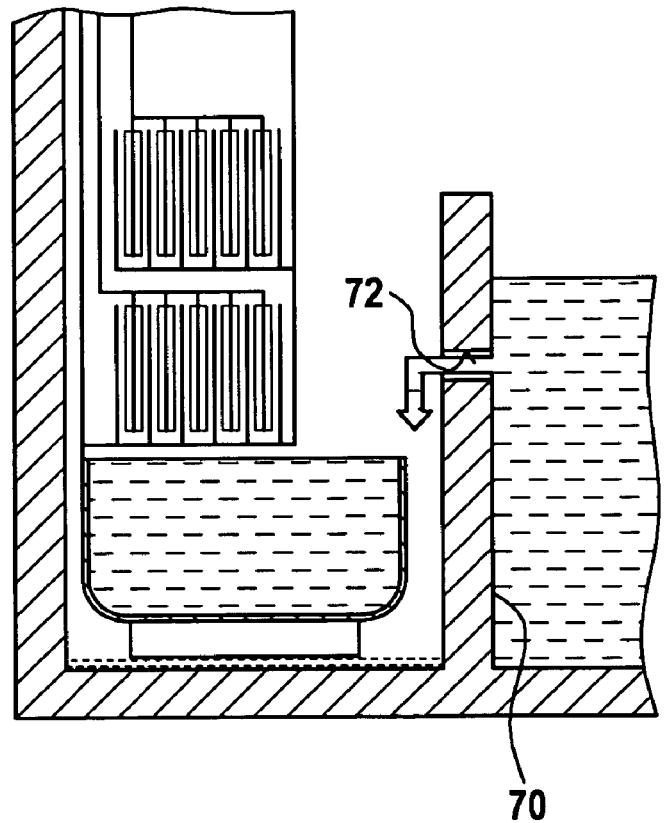
FIG. 8 shows a view similar to FIG. 5 of an altered embodiment of an initialization device.

The initialization device 46 does not absolutely have to contain the movable components described. It may also be formed by a fixed tube and/or an opening 72 leading through a partition wall 70, which may be equipped with a device (not shown) for changing the opening cross-section (FIG. 8), which operates according to the principle of communicating tubes and strives continuously to produce a liquid level equalization between clutch and transmission.

LIST OF REFERENCE NUMBERS 10 driveshaft
12 clutch housing
14 trough
16 blade
18 lamellar packet
20 lamellar packet
22 output shaft
24 output shaft
26 lamellar packet
28 lamellar packet
30 coolant liquid ring
32 intake opening
34 scoop tube
36 line
38 housing
40 temperature control device
41 suction jet pump
42 actuator
44 arm
45 axis
46 initialization device
48 contact plate
50 line
52 liquid reservoir
54 line
56 outlet
58 compression spring
60 pushrod
62 tube section
64 bearing
66 opening
68 wing
70 tube

What is claimed is:

1. A method for cooling a liquid-cooled friction clutch, wherein the clutch includes a housing (38) in which both in which method coolant liquid is supplied radially inside lamellae (18, 20, 26, 28), which transmit torque and may be frictionally engaged, and is removed radially outside the lamellae, and is resupplied at least partially radially inside the lamellae after flowing through a return flow path (36, 40, 41), wherein at least a part of the coolant liquid removed radially outside the lamellae (18, 20, 26, 28) is resupplied by a scoop tube (34) radially inside the lamellae, wherein an immersion depth of the scoop tube (34) in the coolant liquid is regulated by a force equilibrium between a force which is exerted by a coolant liquid ring (30) rotating outside the lamellae on a scoop tube (34) immersed in the coolant liquid ring, and a force which pre-tensions the scoop tube to increase its immersion depth, and wherein the scoop tube (34) is at least partially displaced within a housing (38).

2. The method according to claim 1 wherein the additional coolant liquid, which is conveyed by the coolant liquid flowing along the return flow path (36, 40, 41), is supplied radially inside the lamellae (18, 20, 26, 28).

3. The method according to claim 1 wherein a partial vacuum is generated at a contact point between a coolant liquid ring (30) rotating inside the clutch housing (12) and a component (48) essentially immobile around the circumference, through which coolant liquid is suctioned and supplied to the coolant liquid ring.

4. A liquid-cooled friction clutch, comprising:
at least one lamella (18, 20), which is connected rotationally fixed to a driveshaft (10);
at least one lamella (26, 28), which is connected rotationally fixed to an output shaft (22, 24), wherein these lamellae are operatively arranged to be pressed against one another mutually and positioned inside a clutch housing (12), which is rotationally fixed to the driveshaft; and,
a coolant liquid return line (36), which leads from an area radially outside the lamellae to an area radially inside the lamellae and returns coolant liquid after its radial flow along the lamellae from the radial external area into the radial internal area, wherein an end area of the return line (36) is implemented as a scoop tube (34) having an intake opening, which is immersed radially outside the lamellae (18, 20, 26, 28) in a coolant liquid ring (30) rotating together with the clutch housing (12) and returns the coolant liquid, wherein the scoop tube (34) is moveable in such a way that an immersion depth of the scoop tube (34) into the coolant liquid ring (30) changes.

5. The friction clutch according to claim 4 wherein the scoop tube (34) is pivotable around an axis (45) eccentric to the axis of the coolant liquid ring (30).

6. The friction clutch according to claim 4 wherein an actuator (43), which is connected to the scoop tube with a spring (58) interposed, is provided for pivoting the scoop tube (34).

7. The friction clutch according to claim 6 wherein the force applicable by the actuator (43) to the scoop tube (34) against the flow direction of the coolant liquid ring (30) is adjustable.

8. The friction clutch according to claim 4 wherein the scoop tube (34) is provided with a wing (68), which is directed radially inward against the flow direction of the coolant liquid ring (30).

9. The friction clutch according to claim 4 wherein the coolant liquid ring (30) rotates along in an annular trough (14), which rotates with the clutch housing (12) and is open radially on the interior.

10. The friction clutch according to claim 6 wherein the coolant liquid overflowing from the trough (14) is conducted by at least one blade (16) positioned radially outside the trough to a coolant liquid reservoir (12) located outside the clutch.

11. The friction clutch according to claim 4 wherein the return line (36) leads through a temperature control unit (40) for temperature control of the liquid.

12. The friction clutch according to claim 4 wherein the return line (36) leads through a suction jet pump (41), whose suction intake is connected to a coolant liquid reservoir (52).

13. The friction clutch according to claim 4 wherein a flow sampling component (48) presses against a radial internal surface of the coolant liquid ring (30), which is implemented having an opening (66), to which a refilling line (50), which is connected to a liquid reservoir (52) positioned outside the clutch, is attached.

14. The friction clutch according to claim 13 wherein the refilling line (50) runs between the opening (66) implemented in the flow sampling component (48) and the liquid reservoir (52) in the form of an upside-down U.

15. The friction clutch according to claim 13 wherein the flow sampling component (48) is pre-tensioned in the direction toward the coolant liquid ring (30) so that it floats on its surface and does not sink therein.

16. The friction clutch according to claim 13 wherein the flow sampling component (48) has a surface pressing tangentially on the coolant liquid ring (30) and is bent away from the coolant liquid ring (30) at its end diametrically opposite the flow, so that it floats on the coolant liquid ring.

17. The friction clutch according to claim 13 wherein the end of the line (50) contacting the coolant liquid ring (30) is nearly perpendicular to the surface of the rotating coolant liquid ring.

\* \* \* \* \*

UNITED STATES PATENT AND TRADEMARK OFFICE
CERTIFICATE OF CORRECTION

PATENT NO. : 7,461,732 B2  Page 1 of 1
APPLICATION NO. : 11/375754
DATED : December 9, 2008
INVENTOR(S) : Johannes Arnold It is certified that error appears in the above-identified patent and that said Letters Patent is hereby corrected as shown below:

Col. 8 lines 26-42 Claim 1 should read:
1. A method for cooling a liquid-cooled friction clutch, wherein the clutch includes a housing (38) in which coolant liquid is supplied radially inside lamellae (18, 20, 26, 28), which transmit torque and may be frictionally engaged, and is removed radially outside the lamellae, and is resupplied at least partially radially inside the lamellae after flowing through a return flow path (36, 40, 41), wherein at least a part of the coolant liquid removed radially outside the lamellae (18, 20, 26, 28) is resupplied by a scoop tube (34) radially inside the lamellae, wherein an immersion depth of the scoop tube (34) in the coolant liquid is regulated by a force equilibrium between a force which is exerted by a coolant liquid ring (30) rotating outside the lamellae on a scoop tube (34) immersed in the coolant liquid ring, and a force which pre-tensions the scoop tube to increase its immersion depth, and wherein the scoop tube (34) is at least partially displaced within a housing (38).

Signed and Sealed this

Fourteenth Day of July, 2009

JOHN DOLL
*Acting Director of the United States Patent and Trademark Office*